March 2, 1948.  A. W. BONHAM, JR  2,436,912
DRIVE CONTROL MECHANISM FOR MOTOR VEHICLES AND DETENT DEVICE THEREFOR
Filed Dec. 8, 1945  5 Sheets-Sheet 1

March 2, 1948. A. W. BONHAM, JR 2,436,912
DRIVE CONTROL MECHANISM FOR MOTOR VEHICLES AND DETENT DEVICE THEREFOR
Filed Dec. 8, 1945  5 Sheets-Sheet 3
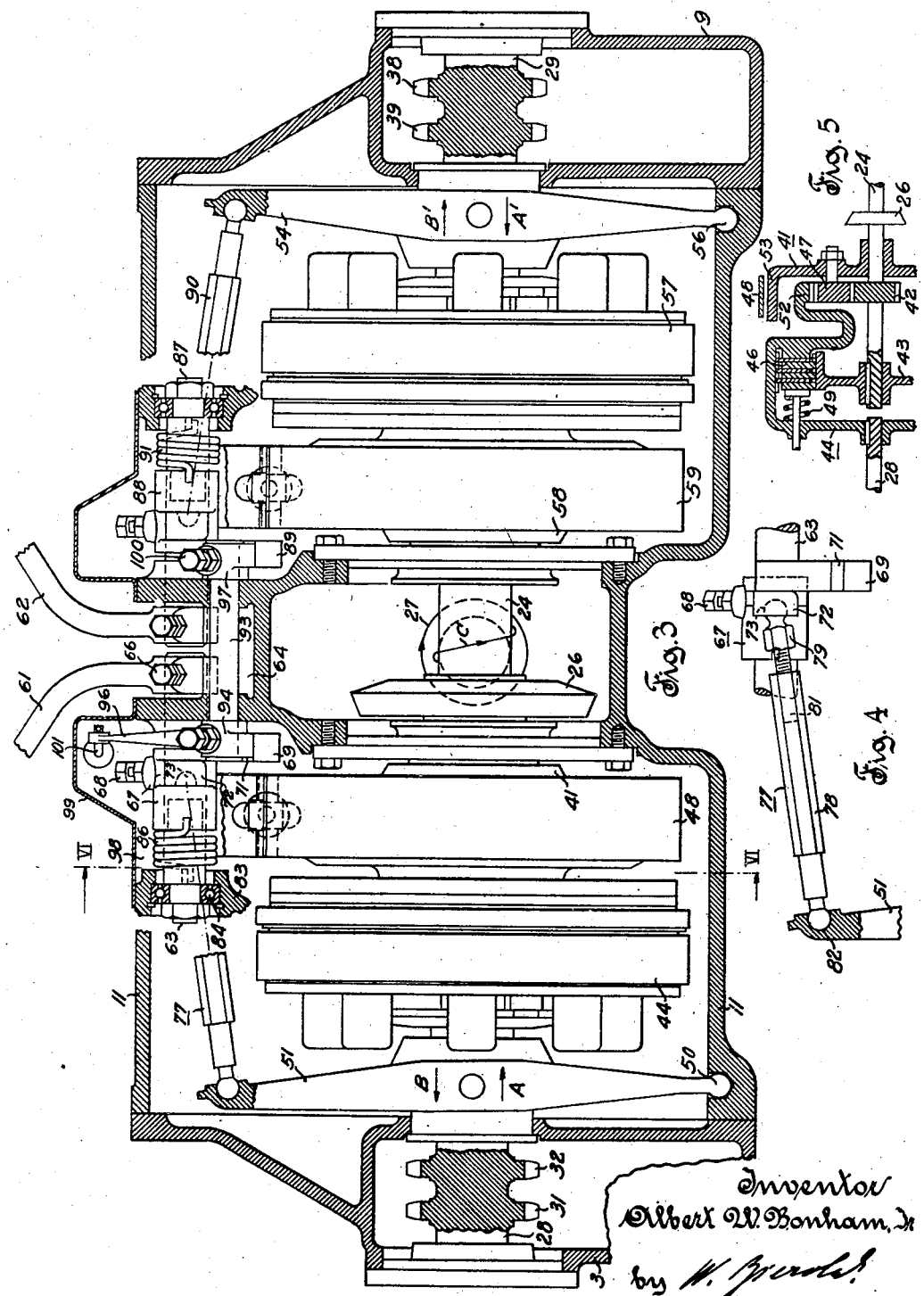
Inventor
Albert W. Bonham, Jr.
by
Attorney

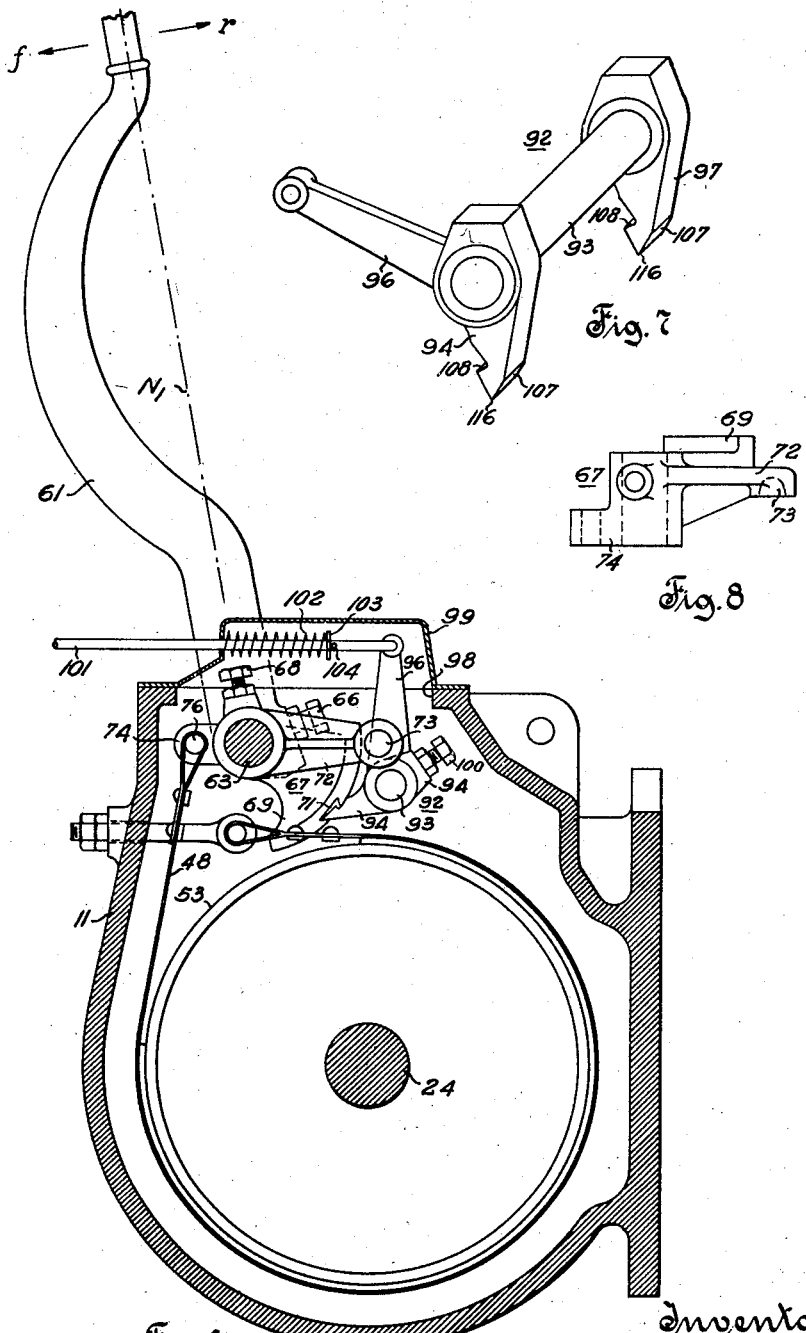

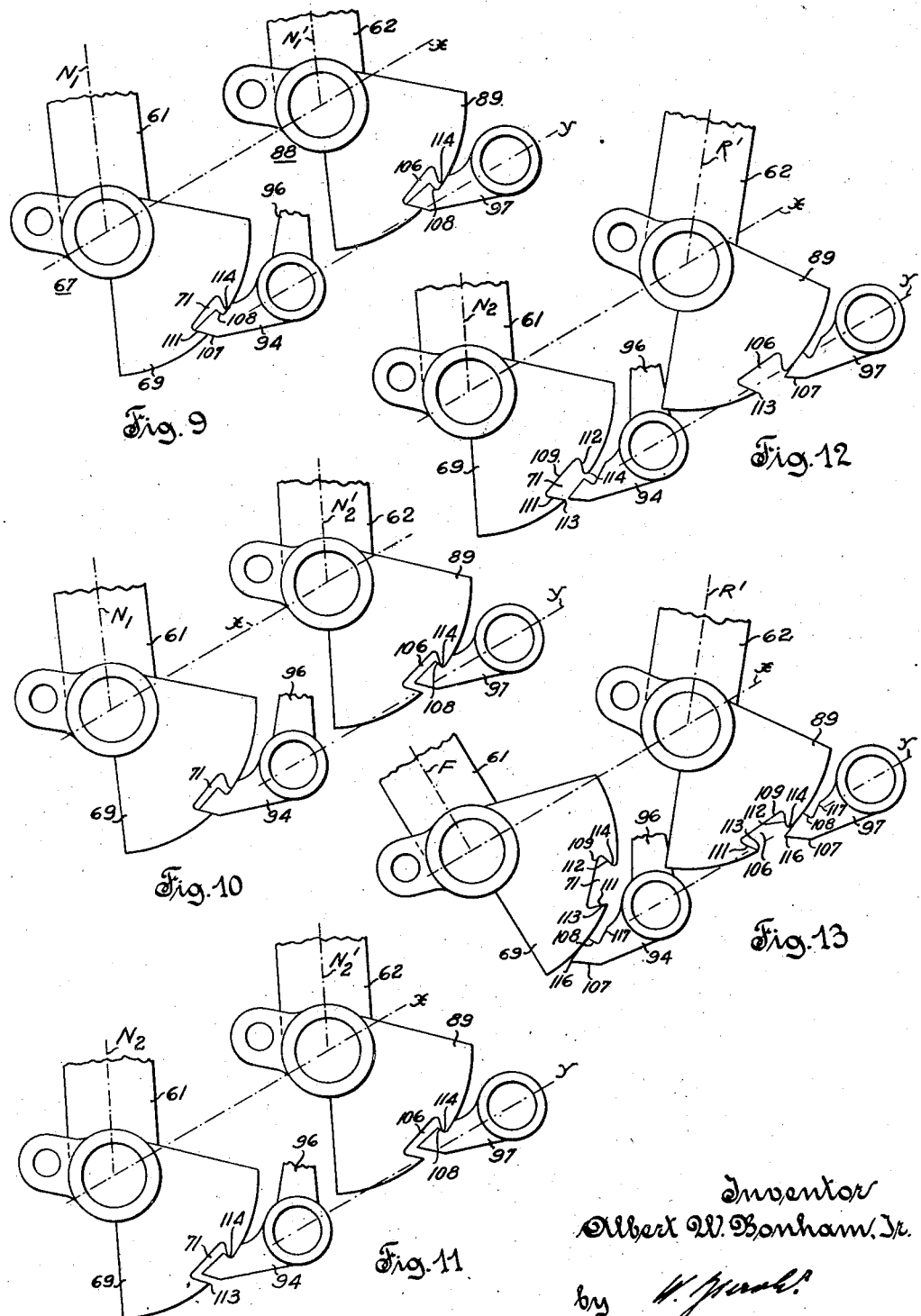

Patented Mar. 2, 1948

2,436,912

UNITED STATES PATENT OFFICE 2,436,912

DRIVE CONTROL MECHANISM FOR MOTOR VEHICLES AND DETENT DEVICE THEREFOR

Albert W. Bonham, Jr., Salt Lake City, Utah, assignor to Allis-Chalmers Manufacturing Company, Milwaukee, Wis., a corporation of Delaware Application December 8, 1945, Serial No. 633,811

12 Claims. (Cl. 180—17)

The invention relates to motor vehicles, and it is concerned more specifically with an improved mechanism for controlling the operation of such vehicles, more particularly as to starting and stopping thereof.

In tractors which are steered by driving, that is, in which steering is effected by varying the drive of ground engaging traction devices at opposite sides of the vehicle, it is usual to provide a pair of clutches, commonly referred to as steering clutches, for controlling the drive of the traction devices. In such tractors, a pair of control levers, one for each steering clutch, are suitably mounted within reach from an operator's seat, and by properly manipulating these control levers, the operator may drive the tractor either straight ahead, or to the right or left, and he may also interrupt the drive of both traction devices by adjusting the control levers to neutral positions, as is well-known in the art.

In addition to the steering clutches in such tractors, two sets of reverse mechanisms are sometimes employed, one for each traction device, the purpose of such reverse mechanisms being to permit driving of the traction devices in opposite directions for short turning, and to permit simultaneous reverse drive of both traction devices, if desired.

U. S. Letters Patent No. 2,197,248, dated April 16, 1940, and granted to A. W. Bonham, Jr., and A. B. Bonham, for Tractor, discloses two such sets of reverse mechanisms in combination with a pair of steering clutches, and it also discloses a pair of control levers, one for each traction device, which are so interrelated with the steering clutches and reverse mechanisms, that the tractor will have the following operating characteristics. First, when both control levers are in neutral positions, no power will be transmitted to the traction devices while the vehicle motor is running and the change speed transmission is in gear; in other words, adjustment of the two control levers to their neutral positions causes demobilization of the vehicle. Second, when the control lever for the right hand traction device is adjusted forwardly from its neutral position, while the tractor motor is running and the change speed transmission is in gear, power from the motor is transmitted to the right hand traction device to drive the latter forwardly; and when the right hand control lever is adjusted rearwardly from its neutral position the right hand traction device is driven reversely. That is, adjustment of the right hand control lever from its neutral position in either direction causes mobilization of the vehicle. Third, when the control lever for the left hand traction device is adjusted forwardly from its neutral position while the tractor motor is running and the change speed transmission is in gear, the left hand traction device is driven forwardly; and when the left hand control lever is adjusted rearwardly from its neutral position, the left hand traction device is driven reversely. That is, adjustment of the left hand control lever from its neutral position in either direction causes mobilization of the vehicle, and in this respect, the left hand lever functions in analogy to the right hand control lever.

An important requirement for a tractor which is operable in the hereinabove outlined manner is the provision of suitable detent mechanisms for releasably retaining the control levers in their neutral positions. Obviously, it is desirable that the control levers should stay in their neutral positions after they have been adjusted to said positions in order to demobilize the vehicle, because it would otherwise be impractical for the operator to leave the demobilized vehicle without first stopping the motor or at least putting the change speed transmission out of gear. In connection with such detent mechanisms it is highly important for practical reasons, as will appear hereinbelow, that they function to safely secure the control levers against accidental release after they have been adjusted to their neutral positions in order to demobilize the vehicle.

Generally, it is an object of the present invention to provide an improved motor vehicle having two control members and power transmitting means operative in response to adjustment of either of said control members to mobilize and demobilize the vehicle.

More specifically, it is an object of this invention to provide in a motor vehicle having steering clutches and reverse mechanisms of the general character outlined hereinbefore, an improved dual control mechanism including two control levers and detent mechanisms therefor, which will safeguard the vehicle against accidental mobilization due to unintentional release of one or both detent mechanisms.

A further object of this invention is to provide a dual control mechanism of the above outlined character, and in which the control levers have a tendency to adjust themselves automatically to drive-establishing positions upon release of the detent mechanisms, and in which such tendency of the control levers is utilized to positively lock the detent mechanisms against release independently of each other, so that it will be necessary to first adjust both control levers in opposition to their tendency to move into drive-establishing positions, before either one can be moved from its neutral into a drive-establishing position.

A further object of the invention is to provide a motor vehicle having a dual control mechanism as outlined hereinbefore, and in which resilient means are provided to urge the control levers towards drive-establishing positions, and the detent mechanisms for the control levers are so arranged and function in such a manner that initial movement of the control levers from their neutral positions in opposition to said resilient means will first unlock the detent mechanism, and so that subsequent movement of either one or both of the control levers in opposition to said resilient means will then release both detent mechanisms, and so that upon such release of the detent mechanisms either or both of the control levers may finally be moved into any desired drive-establishing position.

A further object of the invention is to provide an improved dual control mechanism of the character outlined hereinbefore, which is simple and compact in construction, efficient in operation, and which may be manufactured at relatively low costs.

The foregoing and other objects and advantages of the invention will become more fully apparent from the following description of a preferred embodiment of the invention shown in the accompanying drawings. Referring to the drawings in which like reference characters designate the same or similar parts in the several views:

Fig. 3 is an enlarged rear view of power transmitting and control mechanisms incorporated in the tractor shown in Figs. 1 and 2, housing parts of the tractor being shown in section substantially along line III—III of Fig. 1;

Fig. 4 is a detail view of strut appearing in Fig. 3;

Fig. 5 is a diagram of a steering clutch and reversing mechanism shown in Fig. 3;

Fig. 6 is a side view of the control mechanism and of parts of the power transmitting mechanism shown in Fig. 3, the view of Fig. 6 being taken substantially on line VI—VI of Fig. 3;

Fig. 7 is a perspective view of a latch element appearing in Figs. 3 and 6;

Fig. 8 is a top view of a cam and actuating member appearing in Figs. 3 and 6;

Figs. 9 to 13 are diagrams illustrating different positions of adjustment of the control mechanism shown in Figs. 3 and 6.

Figure 1:
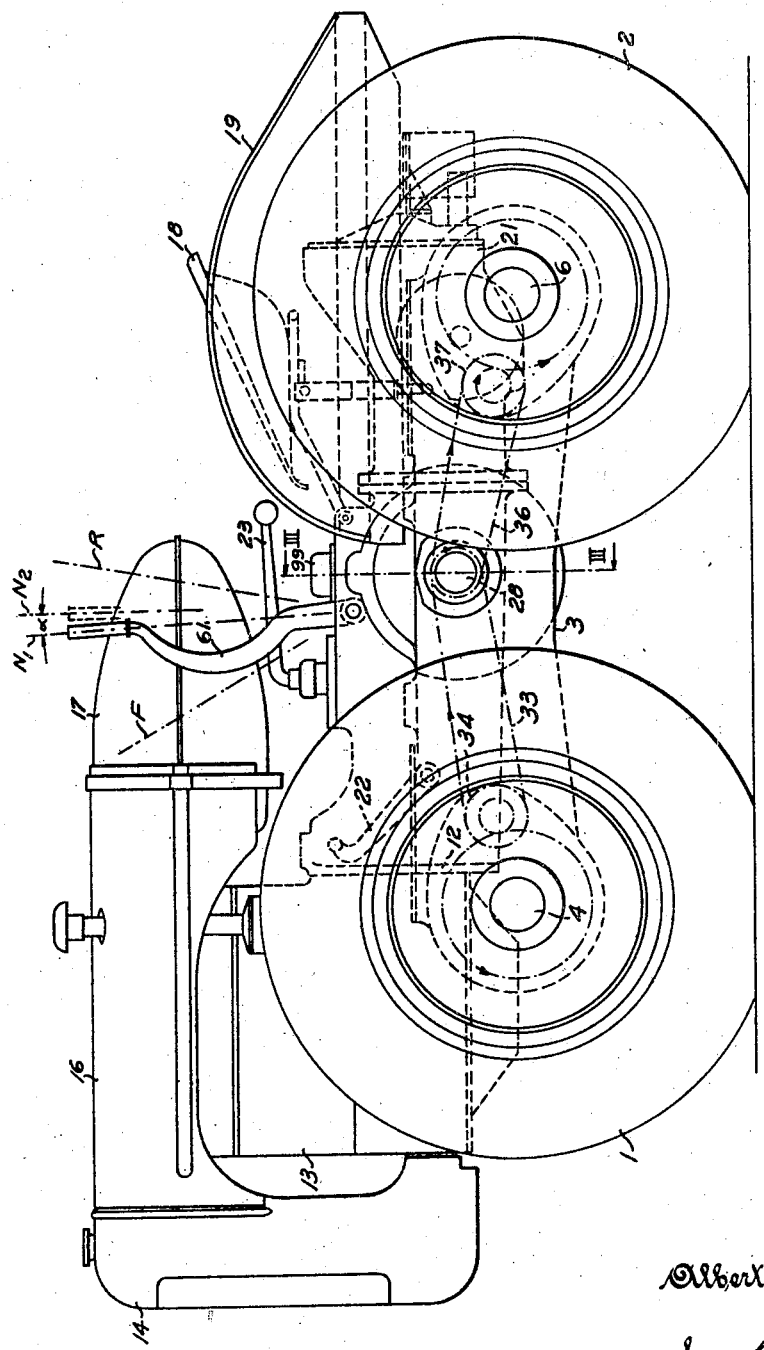
Fig. 1 is a side view of a four wheel drive tractor.
Figure 2:
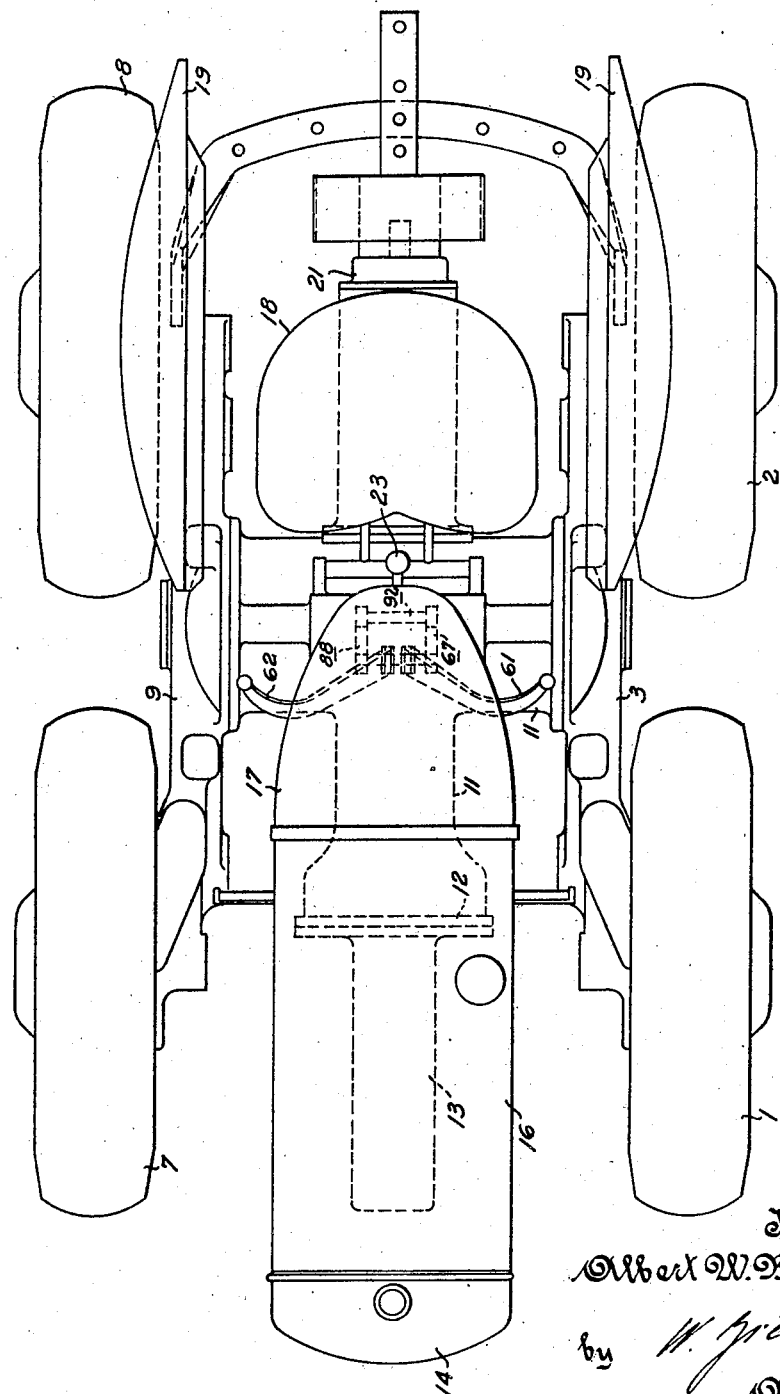
Fig. 2 is a top view of the tractor shown in Fig. 1.

Referring to Figs. 1 and 2, the tractor shown in these figures is of the type in which steering is effected by varying the drive of ground engaging traction devices at its opposite sides. A pair of rubber tired tandem wheels 1 and 2 are mounted, at the left side of the tractor, on a casing 3 for rotation about fixed axles 4 and 6, respectively, and another pair of rubber tired tandem wheels 7 and 8 (Fig. 2) are mounted, at the right side of the tractor, on a casing 9 for rotation about fixed axles in alignment, respectively, with the axles 4 and 6. A body housing 11 between the casings 3 and 9 comprises a spacious hollow transverse rear portion, and a longitudinal hollow portion which merges with and extends forwardly from the transverse rear portion of the housing 11, the latter being of generally T-shaped configuration, as best shown in Fig. 2. The casings 3 and 9 are rigidly secured, respectively, to the opposite ends of the transverse rear portion of the housing 11, each of the casings 3 and 9 having a central flange intermediate its front and rear ends, and the housing 11 being suitably flanged at the opposite ends of its transverse rear portion for connection with the central flanges, respectively, of the casings 3 and 9. The forwardly extending portions of the casings 3 and 9 on which the wheels 1 and 7, respectively, are mounted are laterally spaced from the longitudinal forwardly extending portion of the housing 11, the latter terminating at its forward end in a vertical flange 12. Rigidly connected with the housing 11 at the flange 12 is the cylinder block of an internal combustion engine 13, the engine or motor 13 being of conventional construction and serving to furnish propelling power of the tractor.

The motor 13, the housing 11 and the casings 3 and 9 form the body structure of the tractor, which is sustained on the wheels 1, 2, 7 and 8. Suitably mounted on said body structure are a radiator and radiator shell 14, a hood 16, a fuel tank 17, an operator's seat 18, a pair of fenders 19, and a power take-off unit 21.

The forward portion of the body housing 11, immediately behind the motor 13 encloses a conventional master clutch associated with the flywheel (not shown) of the motor 13, a foot pedal for controlling the master clutch being indicated at 22 in Fig. 1. A conventional change speed transmission (not shown) which is controlled by a gear shift lever 23 is enclosed in the longitudinal portion of the body housing 11 which extends forwardly from the rear transverse portion of the latter. A cross shaft 24 (Fig. 3) which is rotatably mounted in the rear transverse portion of the body housing 11 carries a bevel gear 26 which permanently meshes with a bevel pinion 27 on the output shaft of the change speed transmission. The mechanism through which power is transmitted from the motor 13 to the cross shaft 24, and which comprises the mentioned master clutch and change speed transmission, conforms as to its construction and arrangement with ordinary automotive practice. When the motor 13 is running, transmission of power to the shaft 24 may be effected in the usual manner by first disengaging the master clutch, then placing the change speed transmission into any selected gear, and then gradually engaging the master clutch. In other words, when the motor 13 is running, the shaft 24 will be rotated about its axis as long as the master clutch is engaged and the change speed transmission is in gear.

Referring to Figs. 1 and 3, a sprocket shaft 28 is rotatably mounted in the casing 3 at the left side of the tractor in axial alignment with the cross shaft 24, and a similar sprocket shaft 29 is rotatably mounted in the casing 9 and in axial alignment with the cross shaft 24, at the right side of the tractor. The sprocket shaft 28 has integrally formed therewith two sprocket pinions 31 and 32, which are connected in driving relation, respectively, with the wheels 1 and 2, as indicated in Fig. 1. A roller chain 33 within the casing 3 is trained over the sprocket pinion 31 and over a sprocket pinion 34 which is geared within the housing 3 to the axle 4 of the wheel 1. Another roller chain 36 within the casing 3 is trained over the sprocket pinion 32 and over a sprocket pinion 37 which is geared within the casing 3 to the axle 6 of the wheel 2. The wheels 7 and 8 at the right side of the tractor are connected in driven relation with the sprocket shaft 29 in the same manner as explained hereinbefore in connection with the wheels 1 and 2 and the sprocket shaft 28, two sprocket pinions 38 and 39 being integrally formed with the shaft 29, as shown in Fig. 3.

Referring to Figs. 3 and 5, a steering clutch and reversing mechanism is operatively interposed between the cross shaft 24 and the sprocket shaft 28, and a similar steering clutch and reversing mechanism is operatively interposed between the cross shaft 24 and the sprocket shaft 29. As shown diagrammatically in Fig. 5, the steering clutch and reversing mechanism between the cross shaft 24 and the sprocket shaft 28 comprises a planet carrier 41 which is rotatable relative to the cross shaft 24; a sun gear 42 and a driving clutch member 43 which are connected with the cross shaft 24 for rotation in unison therewith; a composite driven member 44 which is connected with the sprocket shaft 28 for rotation in unison therewith; clutch disks 46 between the driving and driven members 43, 44; a set of planet pinions 47 rotatably mounted on the planet carrier 41; a brake mechanism for the planet carrier 41 including a brake band 48; and a clutch actuating mechanism including a set of loading springs 49.

The loading springs 49 are initially tensioned to normally establish a driving connection between the driving clutch member 43 and the composite driven member 44 through the clutch disks 46, and a clutch shifter yoke 51 (Fig. 3) is mounted within the housing 11 for disengaging said driving connection. The shifter yoke 51 is swingable back and forth in the general direction of the axis of shaft 24 about a pivot center 50 on the housing 11, and the shifter yoke 51 is so arranged that the loading springs 49 tend to swing said yoke about the pivot center 50 in the direction of arrow A in Fig. 3, and so that swinging movement of the yoke 51 about the pivot center 50 in the direction of arrow B in Fig. 3 disengages the steering clutch comprising the clutch disks 46.

The composite driven member 44 (Fig. 5) includes a ring gear 52 which is internally geared to the planet pinions 47, and the latter, in turn, are permanently geared to the sun gear 42. The brake band 48 is wrapped around a drum portion 53 of the planet carrier 41, as more clearly shown in Fig. 6, one end of the brake band being anchored on the housing 11, and its other end being connected with a mechanism for tightening and loosening the brake band, to which mechanism further reference will be made hereinbelow.

The steering clutch and reversing mechanism which, as stated hereinbefore and as shown in Fig. 3, is operatively interposed between the cross shaft 24 and the sprocket shaft 29 at the right side of the tractor, is an opposite hand duplicate of the steering clutch and reversing mechanism which is interposed at the left side of the tractor, between the cross shaft 24 and the sprocket shaft 28, and the foregoing explanations with respect to the left steering clutch and reverse mechanism similarly apply to the right steering clutch and reverse mechanism. Like the steering clutch comprising the clutch disks 46, at the left side of the tractor, the steering clutch at the right side of the tractor is engageable and disengageable by means of a clutch shifter yoke which is indicated in Fig. 3 by the reference character 54, and which is pivoted on the housing 11 at 56. Swinging movement of the shifter yoke 54 about the pivot center 56 in the direction of arrow A' in Fig. 1 causes engagement of the right steering clutch, and swinging movement of the yoke 54 in the opposite direction indicated by the arrow B' causes disengagement of the right steering clutch. The composite driven member of the right steering clutch and reversing mechanism which corresponds to the member 44 at the left side, is indicated in Fig. 3 by the reference character 57, and a planet carrier corresponding to the planet carrier 41 at the left is indicated at the right by the reference character 58. A brake band 59 is wrapped around a brake drum on the planet carrier 58, and the brake band 59 may be tightened and loosened by means of a mechanism which is substantially a duplicate of the tightening mechanism for the brake band 48.

In connection with the cross shaft 24 it has been stated hereinbefore that said shaft is being rotated when the tractor motor 13 is running and the change speed transmission in the forward part of the housing 11 is in gear. The clutch shifter yokes 51 and 54 are shown in Fig. 3 in clutch disengaged positions, and accordingly, no power will be transmitted from the shaft 24 to the sprocket shafts 28 and 29 through the left and right steering clutches, while the shaft 24 is rotating and the shifter yokes 51 and 54 are positioned as shown in Fig. 3. The planet carriers 41 and 58 are rotatable relative to the shaft 24, and if the brake bands 48 and 59 are loose while the shaft 24 is rotating and both steering clutches are disengaged, the reverse mechanisms represented by the planetary gearings at the right and left of the tractor will likewise be ineffective to transmit power from the shaft 24 to the sprocket shafts 28 and 29. That is, the ring gear 52 which is part of the composite driven member 44 at the left side of the tractor will remain stationary, and the planet carrier 41 at the left side will be driven around the shaft 24 in the same direction as that in which the latter rotates. For analogous reasons the planet carrier 58 at the right side will be driven idly around the shaft 24 in the same direction as the latter while the shaft 24 rotates and both steering clutches are disengaged and both brake bands are loose.

The direction in which the shaft 24 rotates when the crank shaft of the motor 13 rotates in its predetermined direction and when the change speed transmission is in one of its forward drive gears is indicated in Fig. 3 by the arrow C. Assuming now that, while both brake bands 48 and 59 are loose, and while the shaft 24 rotates in the direction of arrow C the left steering clutch is engaged by swinging movement of the shifter yoke 51 in the direction of arrow A. As a result of such engagement of the left steering clutch the drive wheels 1 and 2 will be driven in a forward direction. Similarly, the drive wheels 7 and 8 may be driven by swinging movement of the shifter yoke 54 in the direction of arrow A' and consequent engagement of the right steering clutch. For normal forward drive of the tractor both steering clutches are engaged, while both brake bands 48 and 59 are released so as not to impede rotation of the planet carriers 41 and 58, the latter rotating in unison with the shaft 24 and with the composite driven members 44 and 57 when the steering clutches are engaged.

Assuming next that while the shaft 24 is rotating in the direction of arrow C and while both steering clutches are disengaged, the brake band 48 is tightened upon the brake drum 53 of the planet carrier 41. As a result of such tightening of the left brake band 48 the drive wheels 1 and 2 will again be driven but in reverse direction because the composite driven member 44 will now be driven by the shaft 24 through the sun gear 42, the planet pinions 47 and ring gear 52. Similarly, the drive wheels 7 and 8 of the tractor may be driven in reverse direction by tightening the brake band 59 upon the brake drum of the planet carrier 58 while the steering clutch at the right side of the tractor is disengaged.

The shifter yoke 51 and the brake band 48 are operatively connected with a manually operable control lever 61 (Fig. 1) which is pivotally mounted on the housing 11 and has a handle end at convenient height, at the left side of the tractor, within reach from the operator's seat 18; and the shifter yoke 54 and the brake band 59 are operatively connected with a similar control lever 62 (Figs. 2 and 3) which has a handle end at the right side of the tractor, and which is an opposite hand duplicate of the control lever 61.

As shown in Figs. 3 and 6, a rock shaft 63 is rotatably mounted in an upper part of the housing 11, and an inner end portion of the rock shaft 63 projects into a pocket 64 formed in the top wall of the housing 11. The control lever 61 is non-rotatably secured on the projecting end portion of the rock shaft 63 within the pocket 64, as by means of a set screw 66.

Non-rotatably secured to the rock shaft 63 within the housing 11 is a cam and actuating member 67 which is shown in side elevation in Fig. 6, and a top view of which is shown in Fig. 8. As shown in Fig. 3, the member 67 is mounted on an intermediate portion of the rock shaft 63, and it is secured on said rock shaft against rotation relative thereto by a set screw 68. Extending radially from and integrally formed with the hub of member 67 at the side of the latter next to the pocket 64 is a cam portion 69 provided at its periphery with a dovetail recess 71, and with cylindrical cam surfaces at the peripherally opposite sides of the recess 71, the cam surfaces extending in a common cylindrical plane coaxial with the rock shaft 63. Formed at the side of the cam portion 69 remote from the pocket 64, and integral with hub of the member 67 is a clutch actuating arm 72 which extends radially beyond the cam portion 69, and which has at its outer end a spherical socket 73. Also integrally formed with the hub of the member 67, and at the end of said hub remote from the pocket 64 is a brake actuating arm 74 to which one end of the brake band 48 is connected by means of a pin 76, as best shown in Fig. 6.

Referring to Fig. 4, a strut generally indicated by the reference character 77, is operatively interposed between the clutch actuating arm 72 of the member 67 and the upper end of the shifter yoke 51 for the left steering clutch. The strut 77 is made in two sections 78 and 79 which are threadedly connected together as shown at 81, the strut section 78 having a tapped axial bore in a relatively long hexagonal portion thereof, and the strut section 79 having a threaded shank portion which is screwed in to the tapped bore of the strut section 78. The threaded connection between the strut sections 78, 79 permits adjustment of the length of the strut, and suitable locking means (not shown) are provided to secure the strut sections against relative rotation after the strut has been adjusted to its desired length. The portion of the strut section 78 adjacent to the shifter yoke 51 is machined down and terminates in a ball head which is seated in a spherical socket formed at the upper end of the shifter yoke 51. The portion of the strut section 79 adjacent to the arm 72 of the member 67 has a ball head which is seated in the spherical socket 73 (Fig. 8) of the arm 72.

The shifter yoke 51 is shown in Fig. 3 in clutch disengaged position, as has been stated hereinbefore, and while in said position it is subject to thrust, by the loading springs 49 of the left steering clutch, in the direction of arrow A in Fig. 3. Said thrust upon the shifter yoke 51 is transmitted through the strut 77 to the member 67 which in turn is rigidly mounted, as stated, on the rock shaft 63. Fig. 6 shows the member 67 adjusted to an angular position about the axis of rock shaft 63, in which the center of the spherical socket 73 coincides with a horizontal plane through the axis of the rock shaft 63, and the strut 77 in the assembled mechanism is adjusted to such a length that when the member 67 is adjusted to the position shown in Fig. 6, the shifter yoke 51 will occupy the position in which it is shown in Fig. 3, that is, a clutch disengaged position. The brake band 48 is so arranged that when the member 67 is adjusted to the angular position in which it is shown in Fig. 6, the brake band will be slack, that is, substantially inoperative to produce a braking effect upon the planet carrier 41.

The control lever 61 is non-rotatably secured to the rock shaft 63, as stated hereinbefore, and Fig. 6 shows the angular position which is occupied by the lever 61 when the member 67 occupies the position in which it is shown in Fig. 6, and in which position of the member 67 the left steering clutch is disengaged and the brake band 48 is slack, as has been explained hereinbefore. Upon movement of the lever 61 from the position in which it is shown in Fig. 6, in the direction of arrow f in said figure, and which arrow denotes forward swinging movement of the lever 61 relative to the tractor, the ball head of the strut section 79 moves on an arc about the axis of the rock shaft 63 while the ball head of the strut section 78 moves on an arc about the pivot center 52 of the shifter yoke 51 and in a vertical plane through the common axis of shafts 24 and 28. The movement to which the ball head of the strut section 78 becomes subjected as a result of forward swinging movement of the control lever 61 from the position in which said lever is shown in Fig. 6, is in the direction of arrow A in Fig. 3, and it will therefore be seen that such forward swinging movement of the lever 61 causes engagement of the left steering clutch.

Upon movement of the control lever 61 from the position in which it is shown in Fig. 6, in the direction of arrow r in said figure, and which arrow denotes rearward swinging movement of the lever 61 relative to the tractor, the ball head of the strut section 79 again moves on an arc about the axis of the rock shaft 63 while the ball head of the strut section 78 moves on an arc about the pivot center 50 of the shifter yoke 51 and in a vertical plane through the common axis of the shafts 24 and 28. However, the movement to which the ball head of the strut section 78 becomes subjected as a result of rearward swinging movement of the control lever 61 from the position in which said lever is shown in Fig. 6, is in the direction of arrow B in Fig. 3, and the left steering clutch will therefore remain disengaged when the control lever 61 is swung rearwardly from the position in which it is shown in Fig. 6.

With respect to the brake band 48, it will be seen from Fig. 6 that said brake band, which is slack when the control lever 61 is positioned as shown in Fig. 6, will be further slackened when the control lever 61 is swung forwardly from the position in which it is shown in Fig. 6 in order to engage the left steering clutch, and that rearward swinging movement of the control lever 61 from the position in which it is shown in Fig. 6 will cause tightening of the brake band 48 upon the brake drum 53 while the left steering clutch remains disengaged.

Referring again to Fig. 3, the rock shaft 63 is rotatably mounted at its outer end in a wall portion 83 of the housing 11 by means of a ball bearing 84. A portion of the rock shaft 63 between the wall portion 83 and the hub of the cam and actuating member 67 is surrounded by a coiled torsion spring 86 which is anchored at one end thereof on the housing wall 83, and the other end of the spring 86 is anchored on the hub portion of the cam and actuating member 67. The coil spring 86 is so arranged that it will be wound up or torsionally tensioned by movement of the control lever 61 in the direction of arrow r in Fig. 6, and the spring is installed, during assembly of the mechanism, in a suitably wound up condition so that it will have a permanent tendency to move the control lever 61 from its clutch disengaged or neutral position which is indicated in Figs. 1 and 6 by the dash-dotted line $N_1$ to its extreme forward position which is indicated by the dash-dotted line F in Fig. 1, and which extreme forward position corresponds to full engagement of the left steering clutch. In the condition of the mechanism as shown in Fig. 6, the control lever 61 is prevented from moving from its position $N_1$ towards the position F by a releasable latch device which will be described hereinbelow, and when the latch device is released the torque of the coil spring 86 becomes effective to move the control lever 61 into the position F.

The right hand control lever 62 is mounted on the tractor and it is operatively connected with the shifter yoke 54 for the right steering clutch and with the brake band 59 for the right planet carrier 58 in exactly the same manner, as has been explained hereinbefore in connection with the control lever 61 and with the shifter yoke 51 and with the brake band 48. As shown in Fig. 3, a rock shaft 87, corresponding to the rock shaft 63, is mounted on the housing 11 at the right side of the pocket 64 and in axial alignment with the rock shaft 63. The control lever 62 is non-rotatably secured to the rock shaft 87 within the pocket 64, and a cam and actuating member 88, which is an opposite hand duplicate of the cam and actuating member 67, and has a cam portion 89 (Fig. 3), is a non-rotatably secured to the rock shaft 87 within the housing 11. A strut 90, which is a duplicate of the strut 77, is operatively interposed between the member 88 and the shifter yoke 54, and the brake band 59 is connected with a forwardly extending brake actuating arm of the member 88 in the same manner as illustrated in Fig. 6 with respect to member 67 and the brake band 48. A coiled torsion spring 91 corresponding to the torsion spring 86 reacts between the housing 11 and the member 88, and tends to move the control lever 62 into its extreme forward position which corresponds to full engagement of the right steering clutch.

Referring to Figs. 9 to 13, each of these figures shows the cam and actuating members 67 and 68 diagrammatically and in such relation to each other as to perspectively indicate the mounting of the members 67 and 88 on a common axis which is represented by the dash-dotted line X. As pointed out hereinbefore in connection with Fig. 3, the rock shaft 63 which carries the control lever 61 and the cam and actuating member 67, and the rock shaft 87 which carries the control lever 62 and the cam and actuating member 88, are rotatably mounted on the housing 11 in axial alignment with each other, and the dash-dotted line X in Figs. 9 to 13, therefore, represents the common axis of the rock shafts 63 and 87. These rock shafts are rotatable on the housing 11 about the common axis X independently of each other, and Fig. 9 shows the control lever 61 and the member 67 in a position corresponding to that in which these parts are shown in Fig. 6, that is in the neutral position $N_1$. The control lever 62 and member 88 are shown in Fig. 9 in a position of adjustment corresponding to the neutral position $N_1$ of the control lever 61 and member 67, that is, in a neutral position which is indicated in Fig. 9 by the reference character $N_1'$.

The control levers 61 and 62 are releasably secured against forward swinging movement from their neutral positions $N_1$ and $N_1'$, respectively, in which they are shown in Fig. 9, by a latch device which also limits rearward swinging movement of the levers 61, 62, independently of each other, from their neutral positions $N_1$ and $N_1'$; and said latch device is constructed as follows.

Referring to Figs. 3, 6 and 7, a three-armed latch element shown in detail in Fig 7 and generally denoted by the reference character 92, is mounted on the housing 11 for cooperation with the cam portions of the cam and actuating members 67 and 88. As best shown in Fig. 7, the latch element 92 comprises a shaft 93, a double-armed lever comprising a trigger arm 94 and an actuating arm 96 at one end of the shaft 93, and a trigger arm 97 at the other end of the shaft 93. As best shown in Fig. 3, the latch shaft 93 is rotatably mounted in the opposite side walls of the pocket 64, and it projects into the housing 11 at the left and right sides, respectively, of said pocket. As best shown in Fig. 6, the axis of the latch shaft 93 is located rearwardly of and somewhat below the axis of the rock shaft 63, and the double-armed lever 94, 96 is non-rotatably secured to the shaft 93, as by a set screw 100. The top wall of the housing 11 has an opening 98, and the actuating arm 96 of the latch element 92 extends upwardly through the housing opening 98. A dished cover 99 is mounted on the housing 11 over the aperture 98 and a thrust rod 101 which is pivotally connected to the upper end of the actuating arm 96 extends forwardly from the latter and through an opening in the front wall of the cover 99, the rod 101 being slidably supported in the opening of the cover for back and forth movement relative thereto. A coiled compression spring 102 surrounding the rod 101 within the cover 99 is seated at one end on the front wall of the cover 99, and it bears, at its other end against a washer 103 which is backed by a cross pin 104 mounted on the rod 101. In the position of the parts as shown in Fig. 6, the spring 102 is in a state of compression, and it exerts a moderate rearward thrust upon the actuating arm 96 through the washer 103, pin 104 and rod 101.

Referring to Fig. 3, the trigger arm 97 of the latch element 92 is non-rotatably secured to the latch shaft 93 within the housing 11 at the right side of the pocket 64, as by means of another set screw 100. It will also be noted from Fig. 3, that the relative transverse spacing of the trigger arms 94 and 97 matches the relative transverse spacing of the cam portions 69 and 89 of the cam and actuating members 67 and 88, or in other words, the free end of the trigger arm 94 registers with the cam portion 69 of the member 67, and the free end of the trigger arm 97 registers with the cam portion 89 of the member 88, as shown in Fig. 3. For purposes of illustration, the transverse width of the free end of the trigger arm 94 is shown in Fig. 3 as being slightly shorter than the transverse width of the cylindrical cam surfaces of the cam portion 69, and the free end of the trigger arm 97 is shown as being slightly shorter than the transverse width of the cam portion 89.

Referring to Figs. 9 to 13, the cam portion 89 of the cam and actuating member 88 has a dovetail recess 106 corresponding to the dovetail recess 71 of the cam portion 69. The dash-dotted line Y in Figs. 9 to 13 represents the axis of the latch shaft 93, and the trigger arms 94 and 97 are secured to said shaft in such positions that their free ends engage the dovetail recesses 71 and 106, respectively, when the control levers 61 and 62 are in their neutral positions $N_1$ and $N_1'$, respectively, as shown in Fig. 9. As shown in Figs. 7 and 13, the trigger arm 94 terminates at its free end in a foot piece the toe portion of which has a slanting surface 107, and the heel portion of which terminates in a shoulder 108 at right angles to the sole of the foot piece. As shown in Fig. 13, the dovetail recess 71 has a bottom surface 109 and converging sides 111 and 112, the side 111 providing an undercut portion on the cam 69 for cooperation with the slanting surface 107 of the foot piece of the trigger arm 94, as shown in Fig. 9. The side 111 of the recess 71 terminates in a sharp edge 113 at the cylindrical periphery of the cam portion 69, and the side 112 of the recess 71 terminates in a blunt, rounded edge 114 at the cylindrical periphery of the cam portion 69. The circumferential spacing between the edges 113 and 114 of the recess 71 is somewhat larger than the spacing between the toe edge 116 (Fig. 13) and the shoulder 108 of the foot piece at the free end of the trigger arm 94.

The surface 107 is formed on the trigger arm 94 at such an angle that when the foot piece of said trigger arm projects into the recess 71, and the control lever 61 is in the neutral position $N_1$, as shown in Fig. 9, the side 111 of the recess 71 bears flatly upon the surface 107. Said surface contact between the cam portion 69 and the trigger arm 94 secures the control lever 61 against forward swinging movement from the position $N_1$ in which it is shown in Fig. 9. It should further be noted, particularly with reference to Figs. 6 and 9, that when the control lever 61 is in its neutral position $N_1$, in which it is shown in said figures, the latch element 92 cannot be rotated about the axis of the latch shaft 93 in either direction. The trigger arm 94 has an abutment 117 (Fig. 13) which bears upon the cylindrical surface of the cam 69 adjacent to the blunt edge 114 of the recess 71 when the parts are positioned as shown in Figs. 6 and 9, and the thrust of the spring 102 which tends to swing the latch element 92 about the axis of shaft 93 in one direction is taken up by the contact of the abutment 117 with the cam 69. On the other hand, swinging movement of the latch element 92 about the axis of shaft 93 in the opposite direction is positively prevented, while the parts are positioned as shown in Fig. 9, by the engagement of the slanting side 111 of the cam 69 with the slanting surface 107 of the trigger arm 94, the slant of the side 111 being such as to make it impossible for the foot piece of the trigger arm 94 to swing out of the recess 71 while the control lever 61 is in its neutral position $N_1$.

However, it will be noted that when the parts are positioned as shown in Fig. 9, the blunt edge 114 of the recess 71 is spaced circumferentially from the radial shoulder 108 of the trigger arm 94, and the control lever 61 may therefore be moved rearwardly from the neutral position $N_1$ until the blunt edge 114 of the recess 71 engages the shoulder 108 of the trigger arm 94. This condition is shown in Fig. 11, and the corresponding position of the control lever 61 is indicated in said figure by the reference character $N_2$. When the lever 61 is in the position $N_2$ the side wall 111 of the recess 71 no longer impedes swinging movement of the foot piece of the trigger arm 94 out of the recess 71, and reference to the actual release of the foot piece from the recess 71 will be made more fully hereinbelow.

The trigger arm 97 of the latch element 92, has a foot piece at its free end which is a duplicate of the foot piece at the free end of the trigger arm 94. Accordingly, the same reference numerals which are applied in Figs. 7 and 13 at the foot piece of the trigger arm 94 are applied, in the same figures, at the foot piece of the trigger arm 97. The cam and actuating member 88 which is connected with the control lever 62 through the rock shaft 87 is an opposite hand duplicate of the cam and actuating member 67 and, accordingly, the same reference numerals which are applied in Fig. 13 to the various elements of the recess 71 are applied, in the same figure, to the corresponding elements of the recess 106.

The explanations given hereinbefore with reference to the relations which exist between the trigger arm 94 and the cam portion 69 when the control lever 61 is in its neutral position $N_1$, as shown in Fig. 9, similarly apply to the relations which exist between the trigger arm 97 and the cam portion 89 when the control lever 62 is in its neutral position $N_1'$, as shown in Fig. 9. That is, when the parts are positioned as shown in Fig. 9, the foot piece of the trigger arm 97 coacts with the recess 106 to positively prevent forward swinging movement of the control lever 62 from its neutral position $N_1'$, and to positively lock the latch element 92 against swinging movement about the axis of shaft 93 in either direction. The latch element 92 is thus, in effect, double locked against swinging movement about the axis of shaft 93 in either direction when the parts are positioned as shown in Fig. 9, rotation of the latch element 92 in one direction being prevented by contact of the abutment 117 on the trigger arm 94 with the cylindrical cam surface of the member 69, and by contact of the abutment 117 on the trigger arm 97 with the cylindrical cam surface of the member 89; and rotation of the latch element 92 in the opposite direction being prevented by engagement of the side 111 of the recess 71 with the surface 107 on the foot piece of the trigger arm 94, and by engagement of the side 111 of the recess 106 with the surface 107 on the foot piece of the trigger arm 97.

The slight spacing between the blunt edge 114 of the recess 106 and the shoulder 108 of the foot piece of the trigger arm 97, as shown in Fig. 9, permits limited rearward movement of the control lever 62 from its neutral position $N_1'$ into a neutral position $N_2'$, as illustrated in Figs. 10 and 11.

The various mechanisms described hereinbefore permit operation of the tractor as follows. When the control lever 61 is in its neutral position $N_1$ as shown in Figs. 1, 6 and 9, and the control lever 62 is in its corresponding neutral position $N_1'$, as shown in Fig. 9, both clutch shifter yokes 51 and 54 (Fig. 3) are in clutch disengaged positions and both brake bands 48 and 59 are slack, that is, practically ineffective to produce a braking effect upon the planet carriers 41 and 58. Assuming that the tractor motor 13 is running and that the gear shift lever 23 is in a forward drive establishing position, the cross shaft 24 (Fig. 3) will be rotated, but no drive will be transmitted either to the drive wheels 1 and 2 or to the drive wheels 7 and 8, as long as the control levers 61 and 62 are in their neutral positions $N_1$ and $N_1'$, respectively. Nor will a drive be established between the cross shaft 24 and the drive wheels at the left side of the tractor when the left control lever 61 is moved from its neutral position $N_1$ to its neutral position $N_2$. Likewise, no drive will be established between the cross shaft 24 and the drive wheels at the right side of the tractor when the right control lever 62 is moved from its neutral position $N_1'$, to its neutral position $N_2'$.

As indicated in Fig. 1, the angle $\alpha$ through which the control lever 61 is movable between the positions $N_1$ and $N_2$ is relatively small, and the range of movement of the control lever 61 denoted by the angle $\alpha$ constitutes an idling range of the control lever 61. The control lever 62 has a corresponding idling range, the same as indicated by the angle $\alpha$ in Fig. 1.

After the operator has climbed on the seat 18 he takes hold of the handle ends of both levers 61 and 62 and pulls them rearwardly from their neutral positions $N_1$ and $N_1'$, respectively, into the neutral positions $N_2$ and $N_2'$, respectively. Such rearward movement of the control levers 61 and 62 establishes the condition illustrated in Fig. 11. That is, the sides 111 of the recesses 71 and 106 no longer impede swinging movement of the foot pieces of the trigger arms 94 and 97 out of the recesses 71 and 106, respectively, and while the latch element 92 is locked against swinging movement as long as the control levers 61 and 62 are in their neutral positions $N_1$ and $N_1'$, respectively, the latch element 92 becomes unlocked by movement of both control levers 61 and 62 into their neutral positions $N_2$ and $N_2'$, respectively. It will be noted, however, that when the control levers 61 and 62 are in their neutral positions $N_2$ and $N_2'$, respectively, as shown in Fig. 11, the foot pieces of the trigger arms 94 and 97 still project into the recess 71 and 106, respectively, and the latch element 92, under the conditions illustrated in Fig. 11, may be defined as being unlocked for movement into a released position.

In order to move the latch element 92 into released position with respect to the members 67, 88, the operator may pull both control levers 61, 62 rearwardly beyond their idling ranges, or he may pull only one of the control levers rearwardly beyond its idling range while he maintains the other control lever at the rear limit of its idling range. Fig. 12 illustrates the condition which obtains when the operator pulls the control lever 62 rearwardly beyond its idling range while he maintains the control lever 61 in its neutral position $N_2$. As shown in Fig. 11, the blunt edge 114 of the recess 106 bears upon the shoulder 108 of the trigger arm 97, and when the operator pulls the lever 62 rearwardly beyond the position $N_2'$, while the lever 61 is maintained in its position $N_2$, the rearward pull on the lever 62 is transmitted to the latch element 92 through the blunt edge 114 of the recess 106 and the shoulder 108 of the trigger arm 97, with the result that the latch element 92 will be forced to rotate about the axis of the shaft 93 in opposition to the pressure of the spring 102. Such rotation of the latch element 92 causes it to move into the released position which is illustrated in Fig. 12. Instead of forcing the latch element 92 into the mentioned released position by pulling the control lever 62 rearwardly beyond its position $N_2'$, the operator may accomplish the same result by pulling the control lever 61 rearwardly beyond its position $N_2$ while he maintains the control lever 62 in its position $N_2'$; or he may pull both control levers simultaneously to the rear beyond their positions $N_2$ and $N_2'$, respectively.

After the operator has unlocked the latch element 92 in the manner described hereinbefore (Fig. 11), and after he has then released it according to any one of the aforementioned methods (Fig. 12), the operator may let the control levers 61 and 62 swing forwardly into their forward drive establishing positions corresponding to the dash-dotted line F in Fig. 1. In doing so, however, he will have to let the levers follow each other in suitable sequence so as to prevent the foot pieces of the trigger arms 94 and 97 from re-entering the recesses 71 and 106, respectively. This is illustrated in Fig. 13, wherein the foot piece of the trigger arm 94 is shown as bearing upon one of the cylindrical cam surfaces of the cam portion 69, and wherein the foot piece of the trigger arm 97 is shown as bearing upon one of the cylindrical cam surfaces of the cam portion 89. Obviously, the lever 62 can be swung from the latch releasing position in which it is shown in Fig. 13, into the forward drive establishing position represented by the dash-dotted line F in Fig. 1, without impediment by the trigger arm 97, because the latch element 92 is maintained in released position, against the action of the spring 102, due to contact of the trigger arm 94 with the cylindrical surface of the cam portion 69.

Steering of the tractor to the right may be accomplished by movement of the control lever 62 from the position F in Fig. 1 to the position R in said figure, while the control lever 61 is left in the position F, and steering of the tractor to the left may be accomplished by movement of the lever 61 to the position R while the control lever 62 is left in the position F. From the explanations given hereinbefore in connection with Fig. 13, it will be seen that manipulation of the control levers 61 and 62 in the stated manner is not impeded by the latch element 92.

The operator may also adjust both control levers 61, 62 to the position R in Fig. 1, while the gear shift lever 23 is in a forward drive establishing position, in which event the tractor will be driven in reverse.

In order to stop the tractor without disengaging the master clutch, the operator may adjust both control levers 61, 62 to their positions $N_2$ and $N_2'$, respectively, and the pressure of the spring 102 (Fig. 6) will then become effective to swing the latch element 92 from its released position into the operative position as represented in Fig. 11. When the operator then takes his hands off the control levers 61, 62 the loading springs 49 (Fig. 5) of the steering clutches and the springs 86 and 91 become effective to swing the control levers into their positions $N_1$ and $N_1'$, and as a result, the latch element 92 becomes double locked, as explained hereinbefore in connection with Fig. 9.

The fact that the latch element 92 is double locked, as stated, when the control levers 61 and 62 are in their neutral positions $N_1$ and $N_1'$, is an important safety feature of the control mechanism. For instance, the operator may desire to leave the tractor after he has stopped it by adjusting the control levers 61, 62 to their neutral positions $N_1$ and $N_1'$, respectively, and while the motor 13 is running and the gear shift lever 23 is left in a drive establishing position. In dismounting from the tractor, under these conditions, the operator may take hold of the control lever at the side of the tractor at which he is dismounting, and while relying on said lever for support he may pull said lever to the rear. If he is dismounting at the right side of the tractor, the lever subject to rearward pull would be the lever 62, and Fig. 10 illustrates the condition of the control mechanism under the assumed circumstances. That is, the control lever 62 is shown in Fig. 10 as being pulled into its position $N_2'$, while the control lever 61 is shown in its position $N_1$ into which it is urged by the loading springs 49 of the left steering clutch and by the spring 86. Rearward pull on the lever 62, in the position of the parts as shown in Fig. 10, will be transmitted to the latch element 92 through the blunt edge 114 of the recess 106 and through the shoulder 108 of the trigger arm 97, and the latch element will therefore tend to swing about the axis of the shaft 93 in opposition to the pressure of the spring 102. However, the latch element 92 cannot yield to this tendency of swinging about the axis of shaft 93 in the mentioned direction because it is still locked against rotation in said direction by engagement of the side 111 of the recess 71 with the surface 107 of the trigger arm 94. Therefore, the tractor cannot be mobilized by rearward pull on the lever 62 while the lever 61 is in its position $N_1$, and when the operator in dismounting from the tractor, or in climbing upon the tractor, should desire to rely on the control lever 62 for support, he may safely do so without danger of accident although the motor 13 may be running and the change speed transmission be in gear.

While in the foregoing explanations it has been assumed that the operator pulls on the lever 62 while the lever 61 is in its neutral position $N_1$, it is equally safe for the operator to pull on the lever 61 when he dismounts from the tractor or climbs into the seat, while the tractor motor is running and the change speed transmission is in gear, provided that the control lever 62 is in its neutral position $N_1'$. In that case the latch element 92 is locked by cooperation of the foot piece of the trigger arm 97 with the recess 106, and the tractor cannot be mobilized accidently by rearward pull on the control lever 61.

The cam portions 69 and 89, and the latch element 92 with its two trigger arms 94 and 97 provide a pair of releasable detent mechanisms which are operative to determine primary limit positions $N_1$ and $N_1'$ and secondary limit positions $N_2$ and $N_2'$ of the control levers 61 and 62, respectively. Further, the detent mechanisms include locking means, namely, the sides 111 of the recesses 71 and 106, and the surfaces 107 of the trigger arms 94 and 97, which are operative to lock said detent mechanisms as long as one of the control levers 61, 62 is in its aforesaid primary limit position, and to unlock said detent mechanisms, as illustrated in Fig. 11, upon adjustment of both of said control levers into their secondary limit positions $N_2$ and $N_2'$, respectively. Adjustment of the control levers 61 and 62 beyond their secondary limit positions $N_2$ and $N_2'$, respectively, is yieldingly opposed by the detent mechanisms after the latter have been unlocked, as has been explained hereinbefore in connection with Figs. 11 and 12. The blunt edges 114 of the recesses 71 and 106, and the shoulders 108 of the trigger arms 94 and 97 constitute actuating means for the latch element 92 which are operable to release the latch element upon adjustment of both control levers to their secondary limit positions $N_2$ and $N_2'$, and upon subsequent adjustment of one said control levers beyond its secondary limit position. The cylindrical cam surfaces of the cam members 69 and 89 constitute check means cooperable with the latch element 92 so as to maintain the latter released as long as either of the control levers 61, 62 is in a position of adjustment beyond either limit of its idling range.

The latch element 92, the check means 69, 89, the control levers 61, 62 and the torsion springs 86, 91 are functionally interrelated so that either torsion spring will be effective to urge its associated control lever into the extreme forward position whenever the latch element is maintained released by operation of the check means associated with the other control lever, and so that both torsion springs will be precluded from moving the control levers into their extreme forward positions when both check means have been rendered inoperative to maintain the latch element released. That is, whenever the latch element 92 is maintained released by operation of the check means associated with one of the control levers, the other control lever may assume its extreme forward position F under the action of its associated torsion spring, or it may be adjusted manually in opposition to said spring action, to any other desired position, and when the feet of the trigger arms 94, 97 have snapped into the dovetail recesses 71 and 106, respectively, or in other words, when the check means 69, 89 have been rendered inoperative to maintain the latch element 92 released, the control levers 61 and 62 are precluded from moving under the action of the torsion springs 86 and 91 into their extreme forward positions F due to engagement of the locking means represented by the sides 111 of the recesses 71 and 106 with the surfaces 107 of the trigger arms 94 and 97, respectively.

It should be understood that it is not intended to limit the invention to the exact details of construction herein shown and described for various modifications within the scope of the appended claims may occur to persons skilled in the art.

It is claimed and desired to secure by Letters Patent:

1. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, and a pair of releasable detent mechanisms associated, respectively, with said control members and operative to determine primary and secondary limit positions of each of said control members within said idling range, said detent mechanisms including locking means operative to lock said detent mechanisms as long as one of said control members is in its said primary limit position and to unlock said detent mechanisms upon adjustment of both of said control members to their said secondary limit positions.

2. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of releasable detent mechanisms associated, respectively, with said control members and operative to determine primary and secondary limit positions of each of said control members within said idling range, said detent mechanisms including locking means operative to lock said detent mechanisms as long as either of said control members is in its said primary limit position and to unlock said detent mechanisms upon adjustment of both of said control members to their secondary limit positions; and means resiliently urging said control members towards their said primary limit positions.

3. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of detent mechanisms associated, respectively, with said control members and operative to determine primary and secondary limit positions of each of said control members within said idling range, said detent mechanisms including latch means operable to releasably secure said control members against movement beyond their said primary limit positions and to yieldingly oppose adjustment of said control members beyond their said secondary limit positions, and locking means operative to lock said latch means as long as one of said control members is in its said primary limit position and to unlock said latch means upon adjustment of both of said control members to their said secondary limit positions.

4. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of detent mechanisms associated, respectively, with said control members and operative to determine primary and secondary limit positions of each of said control members within said idling range, said detent mechanisms including latch means operable to releasably secure said control members against movement beyond their said primary limit positions and to yieldingly oppose adjustment of said control members beyond their said secondary limit positions, locking means operative to lock said latch means as long as one of said control members is in its said primary limit position, and actuating means for said latch means operable to release the latter upon adjustment of both of said control members to their said secondary limit positions and upon subsequent adjustment of one of said control members beyond its said secondary limit position.

5. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of detent mechanisms associated, respectively, with said control members and operative to determine primary and secondary limit positions of each of said control members within said idling range, said detent mechanisms including common latch means operable to releasably secure said control members against movement beyond their said primary limit positions and to yieldingly oppose adjustment of said control members beyond their said secondary limit positions, locking means cooperable with said latch means to lock the latter as long as one of said control members is adjusted to its said primary limit position, and actuating means for said latch means operable to release the latter upon adjustment of both of said control members to their said secondary limit positions and upon subsequent adjustment of either of said control members beyond its said secondary limit positions; and check means associated with said control members and cooperable with said latch means to maintain the latter released as long as either of said control members is in a position of adjustment beyond either of its said limit positions.

6. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of releasable detent mechanisms associated, respectively, with said control members and operative to determine a primary limit position of each of said control members at one end of said idling range, and a secondary limit position of each of said control members at the other end of said idling range, said detent mechanism including locking means operative to lock said detent mechanisms as long as either of said control members is in its said primary limit position and to unlock said detent mechanisms upon adjustment of both of said control members to their said secondary limit positions.

7. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of releasable detent mechanisms associated, respectively, with said control members and operative to determine a primary limit position of each of said control members at one end of said idling range, and a secondary limit position of each of said control members at the other end of said idling range, said detent mechanisms including common latch means operable to releasably secure said control members against movement beyond their said primary limit positions and to yieldingly oppose adjustment of said control members beyond their said secondary limit positions, locking means cooperable with said latch means to lock the latter as long as either of said control members is adjusted to its said primary limit position, and actuating means for said latch means operable to release the latter upon adjustment of both of said control members to their said secondary limit positions and upon subsequent adjustment of either of said control members beyond its said secondary limit position; and check means associated with said control members and cooperable with said latch means to maintain the latter released as long as either of said control members is in a position of adjustment beyond its said primary limit position.

8. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a pair of releasable detent mechanisms associated, respectively, with said control members and operative to determine a primary limit position of each of said control members at one end of said idling range, and a secondary limit position of each of said control members at the other end of said idling range, said detent mechanisms including common latch means operable to releasably secure said control members against movement beyond their said primary limit positions and to yieldingly oppose adjustment of said control members beyond their said secondary limit positions, locking means cooperable with said latch means to prevent release of the latter as long as either of said control members is adjusted to its said primary limit position, and actuating means for said latch means operable to release the latter upon adjustment of both of said control members to their said secondary limit positions and upon subsequent adjustment of either of said control members beyond its said secondary limit position; primary check means associated with said control members and cooperable with said latch means to maintain the latter released as long as either of said control members is in a position of adjustment beyond its said primary limit position, and secondary check means associated with said control members and cooperable with said latch means to maintain the latter released as long as either of said control members is in a position of adjustment beyond its said secondary limit position.

9. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a support adjustably mounting said control members, a latch element resiliently movable on said support from an operative to a released position, abutment means associated, respectively, with said control members and cooperable with said latch element, in said operative position of the latter, to positively prevent movement of said control members in one direction beyond primary limit positions, respectively, within said idling range, and to urge said latch element from said operative to said released position thereof upon movement of said control elements in the opposite direction to secondary limit positions within said idling range and upon subsequent movement of either of said control elements in said opposite direction beyond its said secondary limit position, said abutment means and said latch element having relatively interlockable portions for securing said latch element against movement from said operative to said released position as long as either of said control elements is in its said primary limit position.

10. In a motor vehicle, in combination, two control members adjustable independently of each other within a predetermined idling range, power transmitting means adapted to drive a pair of traction devices and operative to drive one or the other of said traction devices in response to adjustment of one or the other of said control members, respectively, beyond said idling range, a support adjustably mounting said control members, a latch element resiliently movable on said support from an operative to a released position, primary abutment means associated, respectively, with said control members and cooperable with said latch element, in said operative position of the latter, to determine primary limit positions of said control members, respectively, within said idling range, and secondary abutment means associated, respectively, with said control members and cooperable with said latch element, in said operative position of the latter, to determine secondary limit positions, respectively, of said control members within said idling range, said primary abutment means and said latch element having relatively interlockable portions for securing said latch element against movement from said operative to said released position thereof as long as either of said control elements is in its said primary limit position, and said secondary abutment means being cooperable with said latch element to move the latter from said operative to said released position thereof upon adjustment of both of said control members to their said secondary limit positions and upon subsequent movement of either of said control members beyond its said secondary limit position.

11. A dual control mechanism comprising a support, a pair of control levers pivotally mounted on said support and each being adjustable independently of the other within a predetermined idling range and beyond said range to an operative position, a pair of cam members connected, respectively, with said control levers and each having a circumferential cam surface and a notched portion providing an undercut recess at said cam surface, a latch element movably mounted on said support, and means resiliently urging said latch element into engagement with said cam surfaces, said latch element having foot portions adapted to enter said recesses, respectively, to determine primary and secondary limit positions of said control levers within said idling range, and said foot pieces being interlockable with said recesses, respectively, upon adjustment of said control members into said primary limit positions thereof.

12. A dual control mechanism comprising a support, a pair of control levers pivotally mounted on said support and each being adjustable independently of the other within a predetermined idling range and beyond said range to an operative position, a pair of cam members connected, respectively, with said control levers and each having a circumferential cam surface and a notched portion providing a recess at said cam surface, a pair of rigidly connected foot pieces pivotally mounted on said support and adapted to enter said recesses, respectively, to determine primary and secondary limit positions of said control levers within said idling range, and means resiliently urging said foot pieces into engagement with said cam surfaces, said foot pieces having toe portions and said recesses having undercut portions interlockable with said toe portions, respectively, upon adjustment of said control levers to said primary limit positions thereof, and said foot pieces having heel portions cooperable with edge portions of said recesses, respectively, to swing said foot pieces out of said recesses upon adjustment of said control levers to said secondary limit positions thereof and upon subsequent adjustment of either of said control levers beyond said secondary limit position thereof.

ALBERT W. BONHAM, Jr.

REFERENCES CITED

The following references are of record in the file of this patent:

UNITED STATES PATENTS

| Number | Name | Date |
|---|---|---|
| 1,596,513 | Ainsworth | Aug. 17, 1926 |
| 1,768,645 | Thomas et al. | July 1, 1930 |
| 2,197,248 | Bonham et al. | Apr. 16, 1940 |